United States Patent [19]

Massara et al.

[11] Patent Number: 5,707,109
[45] Date of Patent: Jan. 13, 1998

[54] ACCELERATION COMPENSATING VEHICULAR SEAT ASSEMBLY

[75] Inventors: Andrew J. Massara, Southfield; Steven T. Gamache, Northville, both of Mich.

[73] Assignee: Lear Corporation, Southfield, Mich.

[21] Appl. No.: 595,667

[22] Filed: Feb. 2, 1996

[51] Int. Cl.⁶ ........................................ A47C 3/025
[52] U.S. Cl. ........................ 297/284.9; 297/452.34
[58] Field of Search ............... 297/DIG. 3, 284.9, 297/284.3, 284.1, 216.1, 216.13, 452.41, 452.33, 452.34

[56] References Cited

U.S. PATENT DOCUMENTS

| | | |
|---|---|---|
| 3,270,440 | 9/1966 | Radosevic . |
| 3,635,525 | 1/1972 | Magyar ...................... 297/361.1 X |
| 3,701,499 | 10/1972 | Schubert et al. . |
| 3,983,640 | 10/1976 | Cardullo et al. . |
| 4,059,909 | 11/1977 | Kron . |
| 4,164,079 | 8/1979 | Ashworth . |
| 4,592,588 | 6/1986 | Isone et al. ................... 297/284.9 X |
| 4,634,083 | 1/1987 | McKinnon . |
| 4,707,027 | 11/1987 | Horvath et al. ............... 297/284.9 X |
| 4,722,550 | 2/1988 | Imaoka et al. . |
| 4,924,162 | 5/1990 | Sakamoto et al. . |
| 5,127,708 | 7/1992 | Kishi et al. ................... 297/284.9 X |
| 5,129,704 | 7/1992 | Kishi et al. ................... 297/284.9 X |
| 5,263,765 | 11/1993 | Nagashima et al. .......... 297/284.9 X |
| 5,280,997 | 1/1994 | Andres et al. ................. 297/284.9 |
| 5,320,409 | 6/1994 | Katoh et al. .................. 297/284.9 X |

*Primary Examiner*—Milton Nelson, Jr.
*Attorney, Agent, or Firm*—Howard & Howard

[57] ABSTRACT

A vehicular seat assembly (10) includes a pair of bolsters (18, 20) located on either side of the seat back (14). Each of the bolsters (18, 20) includes a primary adjustor (22) which moves the bolster (18, 20) to a position found to be comfortable by the occupant of the seat (10). Each of the bolsters (18, 20) further include a secondary adjustor (26) disposed adjacent the first adjustor (22). The two secondary adjustors (26) operate independently of each other and deploy when the seat assembly (10) senses a predetermined level of lateral acceleration forces (36 or 38). An accelerometer (34) senses the lateral acceleration (36, 38) and a control circuit (32) sends a signal to an activator (40) to deploy the one of the two secondary adjustors (26).

16 Claims, 5 Drawing Sheets

ACCELERATION COMPENSATING VEHICULAR SEAT ASSEMBLY

BACKGROUND ART

1. Field of the Invention

The invention relates to a vehicle seat. More specifically, the invention relates to a vehicular seat having adjustors which are activated in response to predetermined levels of acceleration forces experienced by the seat.

2. Description of the Related Art

U.S. Pat. No. 4,722,550, issued to Imaoka et al. on Feb. 2, 1988, discloses a seat assembly for use in a motor vehicle. The seat assembly includes a seat portion, a seat back, and side bolster supports. A plurality of hardness-changing members including air bags, are disposed in each of the seat sections. An actuating means comprising an air pump may be actuated by a manual switch to deploy the air bags to increase the hardness at each of the seat sections. Further, a detector detects an engine running condition to automatically control the deployment of the air bags in response to a vehicular speed and steering angle, which are taken by the speed sensor and steering angle detecting sensor, respectively. The air bags in the side bolster supports are activated by the controller when the speed sensor and steering angle detecting sensor exceed predetermined limits. This seat does not include an accelerometer to detect lateral acceleration of the vehicular seat, nor does the controller of this vehicular seat independently control the left and right air bags of the side bolster supports.

SUMMARY OF THE INVENTION

A vehicular seat assembly is disclosed having a seat cushion and a seat back pivotal about the seat cushion. Two bolsters are secured to each side of the seat back. Primary adjustment means adjusts each of the bolsters relative to the seat back to provide support for an occupant. The vehicular seat assembly is characterized by secondary adjustment means disposed adjacent the first adjustment means for adjusting each of the bolsters to provide additional support to the occupant independently of the first adjustment means when the vehicular seat assembly receives forces of lateral acceleration above a predetermined threshold.

The advantage associated with the invention includes the ability to adjust the vehicular seat to a comfortable position and subsequently receive additional support, each side independent thereof, based on forces of lateral acceleration acting on the vehicular seat.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
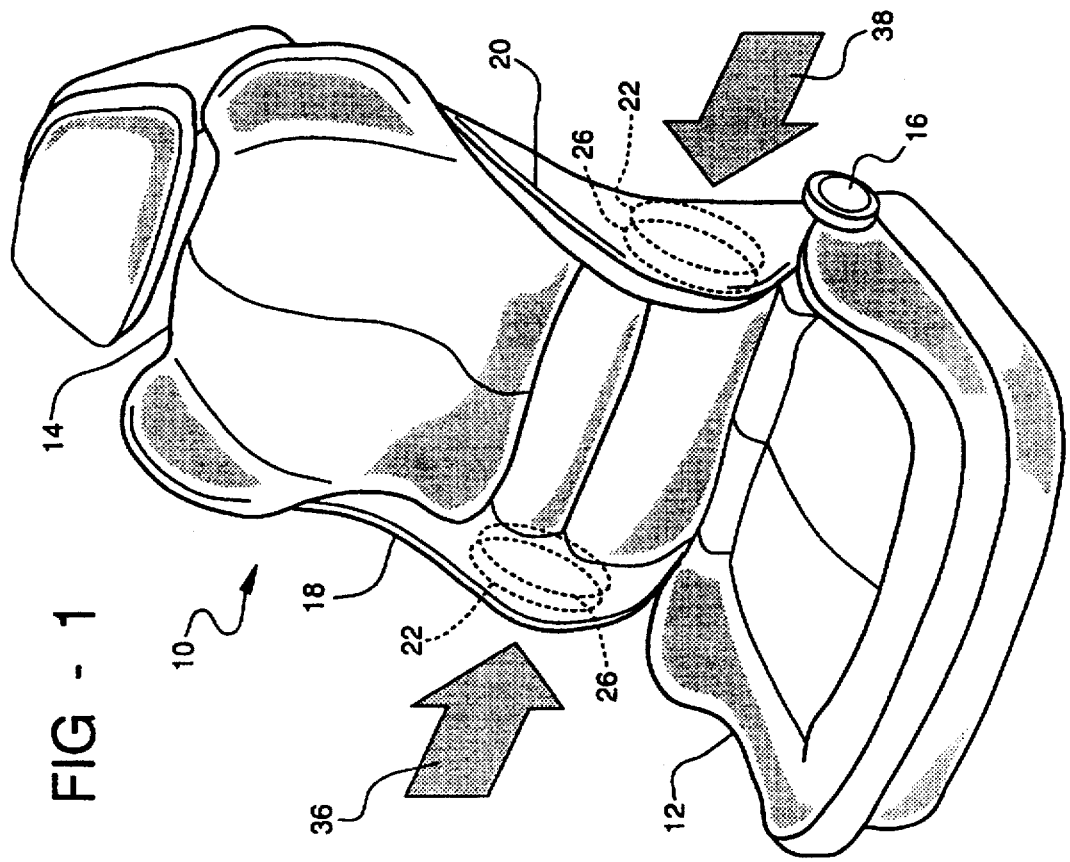
FIG. 1 is a perspective view of a vehicular seat showing the preferred embodiment of the subject invention in schematic form.

A vehicular seat assembly is generally shown at 10 in FIG. 1. The vehicular seat assembly 10 includes a seat cushion 12 and a seat back 14. The seat back 14 is pivotable about a pivot point represented by a seat adjustor 16 located at the back of the seat cushion 12.

The seat assembly 10 also includes right 18 and left 20 side bolsters (right and left orientation determined by the occupant sitting in the vehicular seat 10). The two side bolsters 18, 20 are fixedly secured to the seat back 14 on either side of the seat back 14. Therefore, the right bolster 18 is disposed adjacent the right side of the occupant and the left bolster 20 is disposed adjacent the left side of the occupant.

Figure 2:
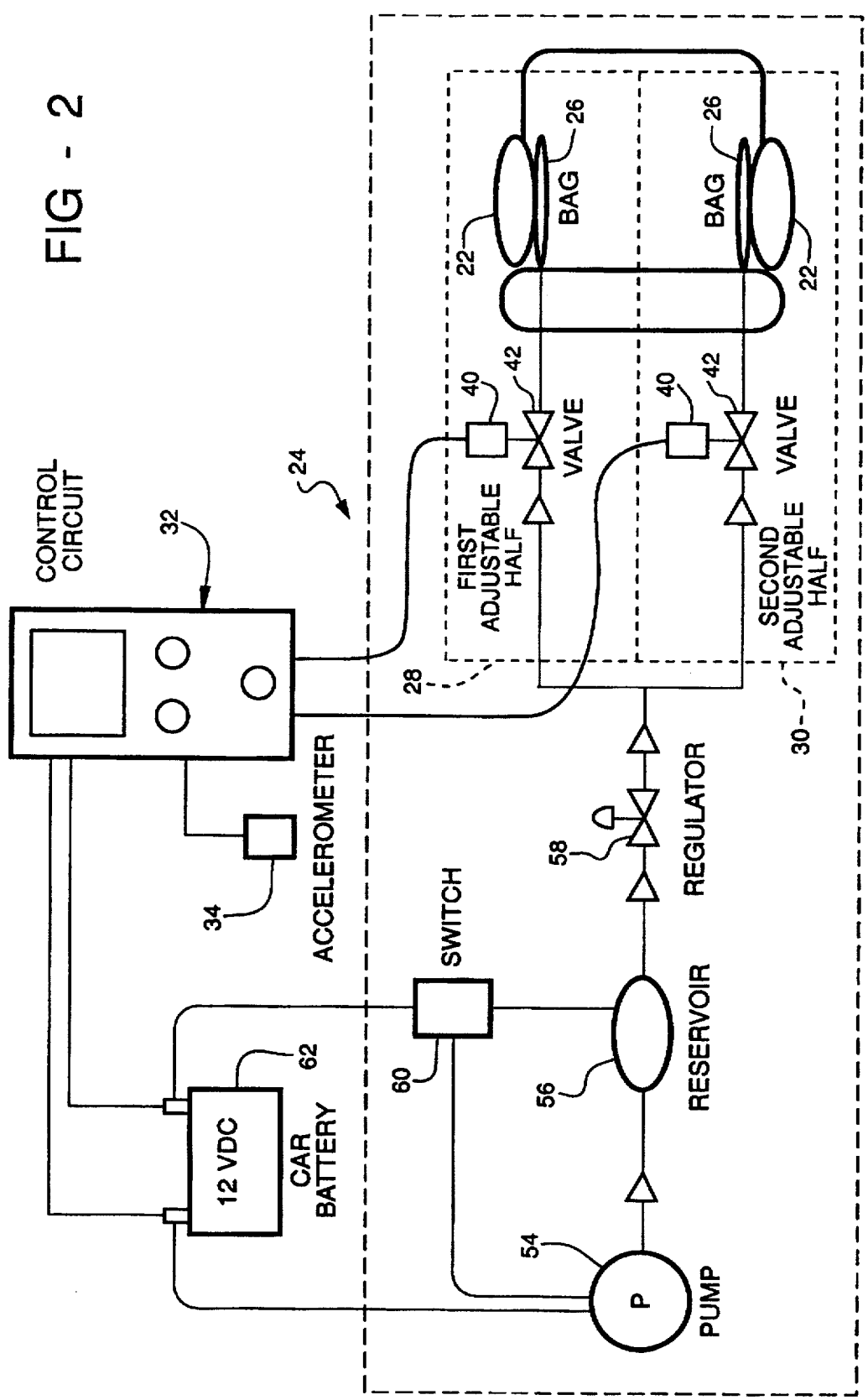
FIG. 2 is a block diagram representation of the preferred embodiment of the subject invention.

Primary adjustment means 22, shown in FIG. 2 and in phantom in FIG. 1, adjust each of the side bolsters 18, 20 relative to the seat back 14 to provide selective comfort to the occupant of the seat. The primary adjustment means 22 may be any standard type of bolster adjustor known in the art. In the preferred embodiment, the primary adjustment means 22 includes a pneumatic bag located in each of the bolsters 18, 20 wherein fluid, such as air, is forced into and out of the primary adjustment means 22 to adjust the orientation of the left 20 and right 18 bolsters. It would be obvious to those skilled in the art to replace the pneumatic bags with a mechanical system operating on levers as is shown in the prior art.

Figure 3A:
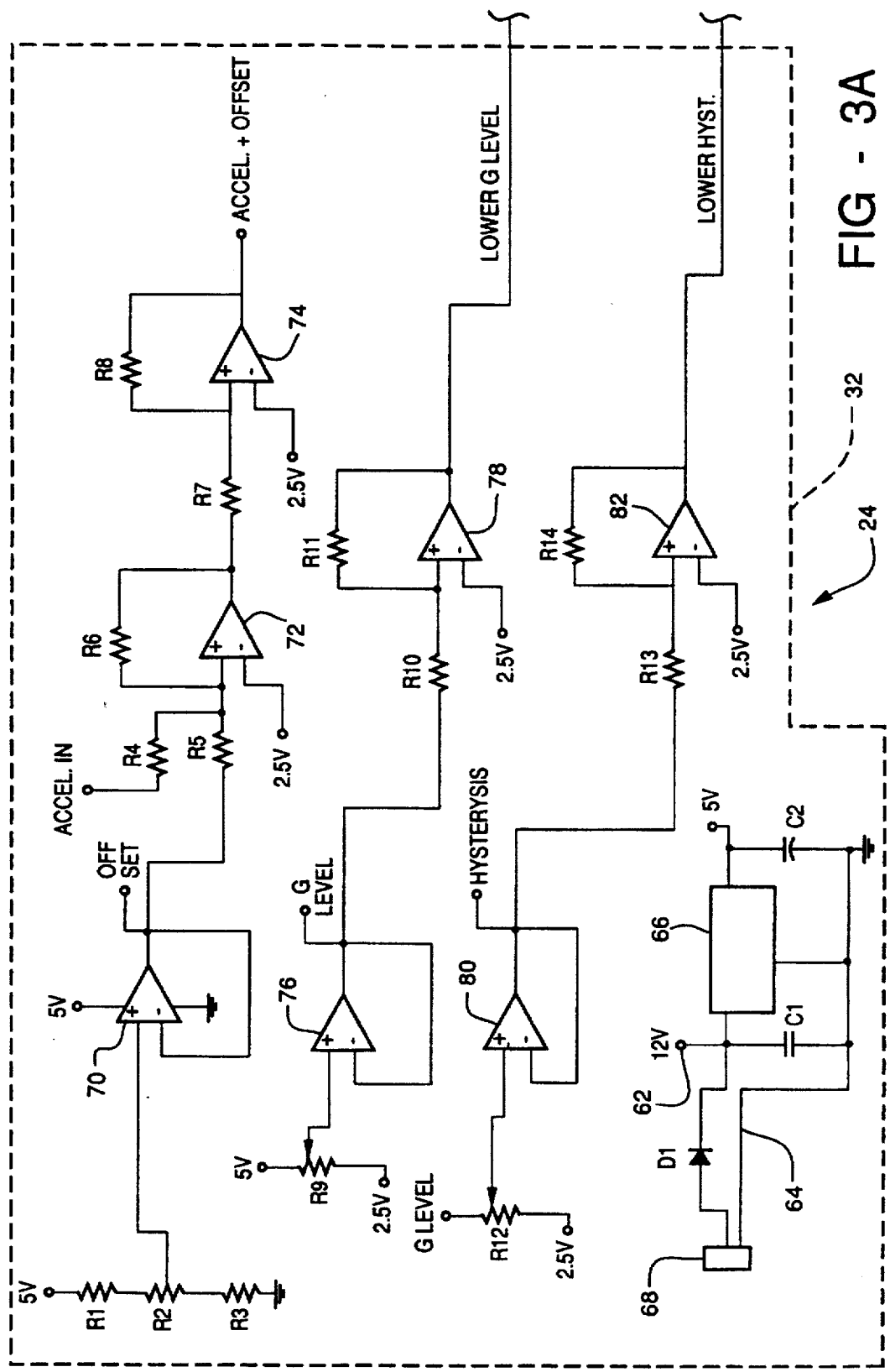
FIGS. 3A and 3B are schematic diagrams of the electronic circuit of the embodiment of the subject invention.
Figure 3B:
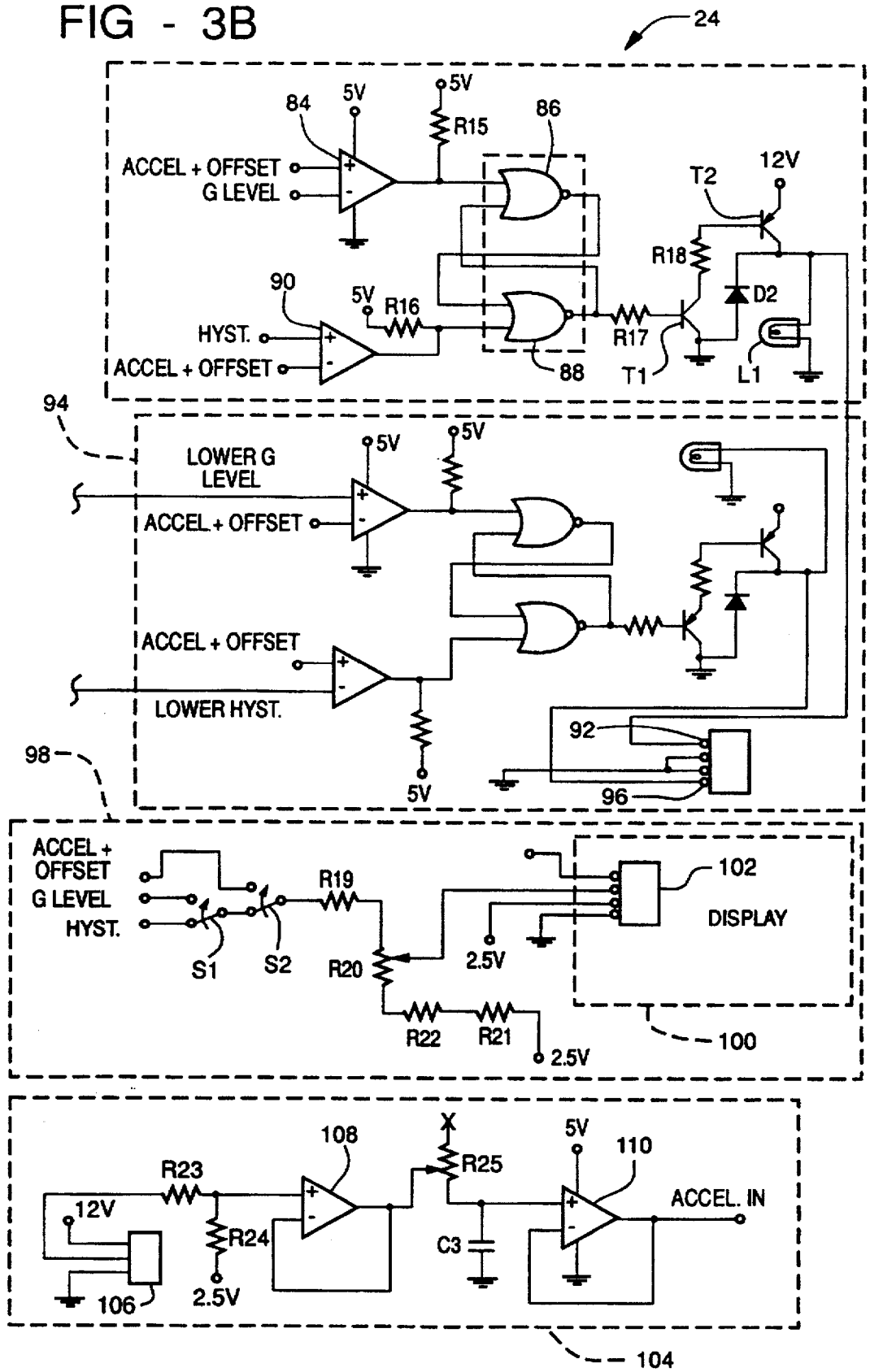

The vehicular seat assembly 10 is characterized by a secondary adjustment means generally shown at 24 in FIGS. 2, 3A and 3B. The secondary adjustment means 24 includes two inflatable bags 26 which are disposed adjacent the primary adjustment means 22. The secondary adjustment means 24 adjusts each of the bolsters 18, 20 to provide additional support to the occupant independently of the primary adjustment means 22 when the vehicular seat assembly 10 experiences forces above a predetermined threshold due to lateral acceleration 36, 38.

The secondary adjustment means 24 includes first 28 and second 30 adjustable halves. The first 28 and second 30 adjustable halves are actuatable to extend the bags 26 between retracted and deployed positions. More specifically, the first adjustable half includes one of the inflatable bags 26 which is extendable between retracted and deployed positions whereas the second adjustable half 30 includes the other inflatable bag 26 which is also movable between the retracted and deployed positions.

Control means, generally indicated at 32, is used for controlling movement of the first 28 and second 30 adjustable halves between the retracted and deployed positions independently of each other. More specifically, the control means 32 controls which of the adjustable halves 28, 30 is to be actuated to either extend or retract the bags 26 to the deployed position or the retracted position, respectively. The control means 32 is capable of controlling one or both of the adjustable halves 28, 30, i.e., the inflatable bags 26 associated with the first 28 and second 30 adjustable halves. The circuitry shown in FIGS. 3A and 3B associated with the control means 32 will be discussed in greater detail subsequently.

Sensing means 34 senses lateral acceleration 36, 38 experienced by the vehicular seat assembly 10. When the seat assembly 10 is moving through a turn it experiences forces of lateral acceleration as graphically represented by the arrows 36, 38 shown in FIG. 1. The lateral acceleration experienced by the seat assembly 10 tends to force the occupant against one or the other of the two bolsters 18, 20. Therefore, the two inflatable bags 26 associated with the first 28 and second 30 adjustable halves of the secondary adjustment means 24 help maintain the occupant in a center position by significantly reducing the effort the occupant needs to exert against the seat, steering wheel, or floor as may be required depending on the severity of the lateral acceleration 36, 38. The sensing means 34 includes an accelerometer 34 because the accelerometers 34 are the most sensitive, accurate and reliable devices for measuring acceleration in the vehicular environment. Other modes for measuring acceleration include a "g" switch and a digital logic program which compares the steering wheel angle to the vehicle speed. The sensitivity of the two above-identified acceleration sensing options are not used in the preferred embodiment because the sensitivity of the driver far exceeds the sensitivity of the "g" switch or the digital logic used to compare the steering wheel angle and the vehicle speed. Further, accelerometers 34 do not require recalibration and are stable and durable as is required by the environment in which the subject invention is being placed.

Activating means 40 deploys each of the first 28 and second 30 adjustable halves at predetermined threshold levels of first and second lateral acceleration forces. The first and second lateral acceleration thresholds are equal and opposite in direction. More specifically, a first lateral acceleration force 36 acts on the occupant to urge the occupant into the left bolster 20. The inflatable bag 26 located in the left bolster 20 inflates at a predetermined acceleration level 36. Likewise, the inflatable bag 26 and the right bolster 18 inflates with the lateral acceleration 38 which forces the occupant into the right bolster 18 equal and opposite to the lateral acceleration 36 which forces the occupant into the left bolster 20. The activating means 40 are solenoids which open valves 42 independently of each other.

Figure 5:
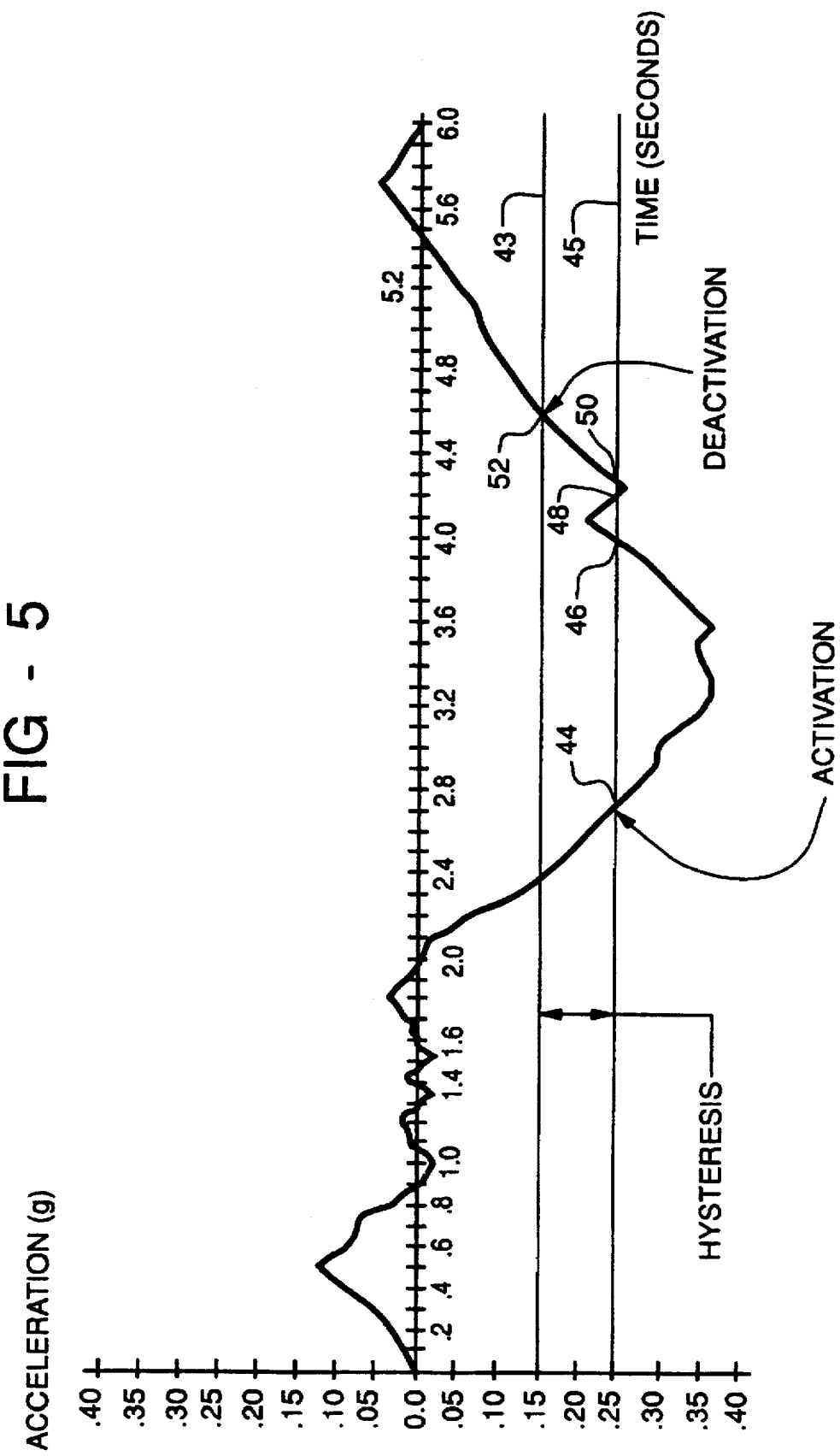
FIG. 5 is a graphic representation of an example of lateral acceleration experienced by a vehicle.

Deactivating means 58 allows each of the inflatable bag 26 to retract at third and fourth levels of lateral acceleration forces 43 (one shown in FIG. 5). The third and fourth lateral acceleration forces are equal and opposite in direction. Further, the absolute values of the third and fourth lateral accelerations are less than the absolute values of the first and second lateral accelerations which are required to activate the inflatable bags 26. Therefore, the inflatable bags 26 are filled at an acceleration value greater than the acceleration value in which they are deflated. This hysteresis is represented in FIG. 5 wherein an inflatable bag 26 is inflated at activation point 44. Once the acceleration drops below the activation level 45 at point 46, the inflated bag 26 does not deflate. The acceleration then crosses the activation point at 48 and 50 wherein the inflatable bag 26 is still inflated. The inflatable bag is not deflated until the acceleration drops below the deactivation point 52 at which time the bag is fully deflated and, in the graphic representation of FIG. 5, does not return to the inflated state. Because the acceleration in the graph of FIG. 5 does not exceed 0.15 g's, the second of the two inflatable bags 26 was never deployed or inflated. Returning to FIG. 2, valving means 42 are controllable by the control means 32. The valving means 42 are movable between an open position and a closed position allowing fluid, i.e., air, to pass into and out of the inflatable bags 26 when the valving means 42 are in the open position. The activating means 40 also include solenoids 40 which are activated by the control means 32 for moving the valving means 42 between the open and closed positions. When the valving means 40 are closed, the air is allowed to pass out of the bags 26 into the open atmosphere.

A compressor or pump 54 is used to compress air into a reservoir 56. The reservoir remains pressurized between 30–50 psi. The deactivating means 58, a regulator in the preferred embodiment, is located downstream of the reservoir 56 and allows approximately 18 psi of air to pass therethrough and into the inflatable bags 26 depending on which valve 42 is open. Therefore, the regulator 58 regulates the air pressure entering the inflatable bags 26 while eliminating the need for the pump 54 to provide 18 psi of air instantly upon actuation. The remaining air pressure in the reservoir 56 is used for subsequent inflations of one or the other of the air bags 26. This allows the compressor 54 to be used as minimally as possible. A switch 60 deactivates the compressor 54 when the air inside the reservoir 56 reaches a pressure of 50 psi. The control means 32, the pump 54 and the switch 60 are connected to the car battery 62 to receive power therefrom.

The circuit used to operate the secondary adjustment means 54 is shown, in part, in FIG. 3A. The control circuit 32 includes a voltage divider 64 shown in the bottom left hand corner of FIG. 3A. The voltage divider receives 12 volts from the car battery 62 and divides the voltage to an output of 5 volts. Capacitors C1 and C2 are connected between ground and the input and the output of the voltage dividing chip 66. A diode D1 is connected between the junction 68 and the battery 62 and the voltage divider 66. The junction is also connected to the ground.

Resistors R1, R2 and R3 are in series between 5 volts and ground. wherein R2 is a variable resistor and connected to the non-inverted input of op amp 70. The output of the op amp 70 is connected to the inverting input of the op amp 70 and to an offset value. The lateral acceleration, denoted as "ACCEL. IN" is added to the output of the op amp 70 and the offset through resistors R4 and R5. These values are connected to the noninverting input of op amp 72 wherein the inverted input of the op amp 72 is connected to 2.5 volts (a mid point voltage regulator converting 5 volts to 2.5 volts is not shown in the Figures), the output of the op amp 72 is connected to the noninverting input thereof through resistor R6. The output of the op amp 72 is connected to the noninverting input of a third op amp 74 through resistor R7. The inverting input of the op amp 74 is connected to 2.5 volts and the output is connected to the noninverting input through resistor R8. The "ACCEL+OFFSET" establishing the value at which the vehicular seating assembly 10 is experiencing is the output of the segment of the control circuit 32. The ACCEL+OFFSET output will be further discussed when discussing the circuit of FIG. 3B.

The G level to determine the activation G force is set by op amps 76 and 78 wherein the variable resistor R9 is connected between 5 volts and 2.5 volts and to the noninverting input of the op amp 76. The output is of the op amps 76 is connected directly to the inverting input thereof. The predetermined G level is also connected to the output of the op amp 76. This output is connected to the noninverting input of the second op amp 78 through resistor R10. The inverting input of the op amp is connected to 2.5 volts. The output of the op amp 78 is connected to the noninverting input of the op amp 78 through the resistor R11. The output of the op amp 78 creates the lower G level to establish the value for the deactivation acceleration.

The hysteresis value is connected to the output and the inverting input of an op amp 80. The noninverting input of the op amp 80 is connected to resistor R12 which is a variable resistor connected between the g value and 2.5 volts. The output of the op amp 80 is connected to the noninverting input of the op amp 82 through resistor R13.

The output of the op amp 82 is connected to the noninverting input of the op amp 82 through resistor R14. The inverting input is connected to 2.5 volts. The output of the op amp 82 indicates the lower hysteresis value, to be discussed subsequently.

Turning to FIG. 3B, the ACCEL+OFFSET is connected to the noninverting input of the op amp 84. The G level is connected to the inverting input of the op amp 84. The output of the op amp 84 is connected to a NOR gate 86 wherein a resistor R15 is also connected to the input of the NOR gate 86 and 5 volts. The NOR gate 86 and a second NOR gate 88 are connected in a flip-flop configuration wherein the input of the second NOR gate 88 is connected to 5 volts through resistor R16 and the output of an op amp 90 whose noninverting input is the hysteresis value and the inverting input is the ACCEL+OFFSET value. The output of the flip-flop is connected to a transistor T1 through resistor R17. The transistor T1 is set up in base-emitter configuration with a resistor R18 connected between the base of a second transistor T2 and the source of the first transistor T1. A diode D2 is connected between the collectors of both of the transistors T1, T2. A lighting element L1 is lit when the transistor T2 is conducting.

The collector of the second transistor T2 is connected to an activation in 92 which activates one of the two solenoids 40 to activate one of the two valves 43 to inflate one of the two inflatable bags 26.

A similar sub-circuit 92 is shown directly below which displays the similar circuit for the other of the two solenoids 40 which will be activated through the activation pin 96. Because this circuit is similar, it will not be discussed in detail.

A sub-circuit 98 includes two switches S1, S2 which are each movable between two positions to determine which value, either the ACCEL+OFFSET value, the G level value, or the hysteresis value will be displayed through a display sub-circuit 100. The value chosen, depending on the positions of the switches S1, S2, will be sent through a resistor R19 and a variable resistor R20. The variable resistor R20 is connected to resistors R21 and R22, which are serially connected to 2.5 volts. The resistor R20 is also connected to the display junction 102.

The accelerometer sub-circuit 104 is shown to include an acceleration detection device 106 which is connected between 12 volts and ground. The output of the acceleration detection device 106 is connected to a resistor R23. The resistor R23 is also connected to a resistor R24 and the noninverting input of an op amp 108. The resistor R24 is also connected to 2.5 volts. The output of the op amp 108 is connected to the inverting input thereof. The output is also connected to a resistor R25 which is a variable resistor connected to a capacitor C3. The capacitor C3 is also connected to ground. The capacitor C3 and the resistor R24 connected to the noninverting input of the op amp 110, the output of which is the accelerator input value which is also connected to the inverting input of the op amp 110.

Figure 4:
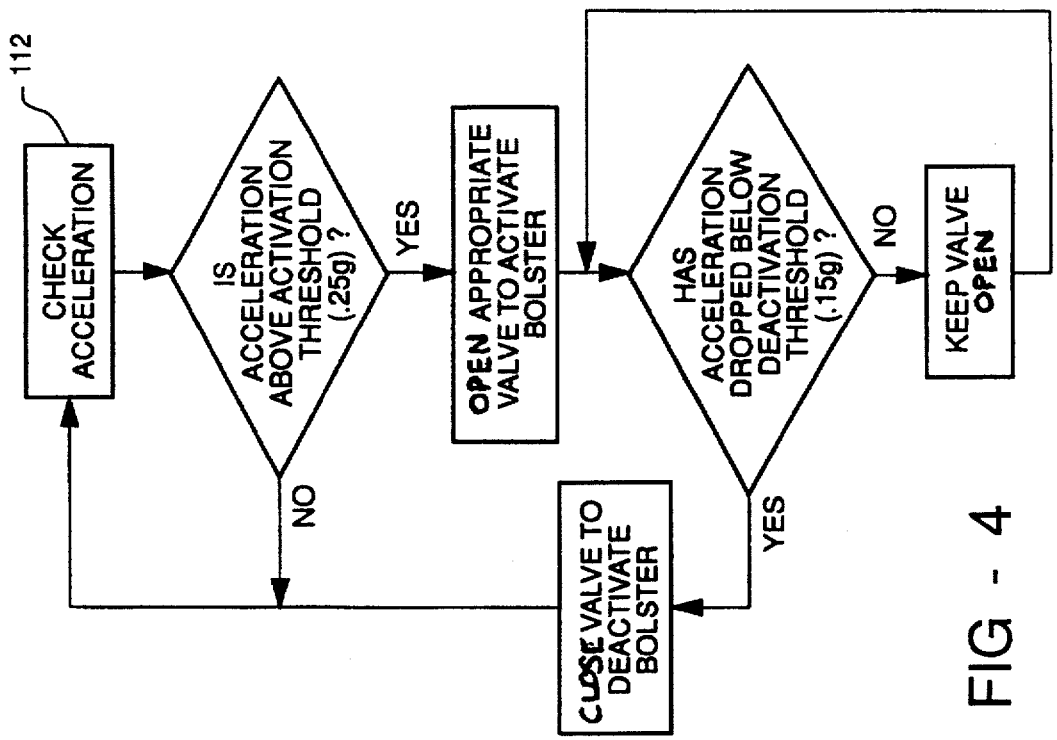
FIG. 4 is a block diagram of the steps performed by the controller of the preferred embodiment of the subject invention.

Turning to FIG. 4, the method of the subject invention begins with checking the acceleration 112. It is then determined if the level of acceleration forces is above the threshold value, 0.25 g in the preferred embodiment. If the acceleration value is not greater than 0.25 g, the acceleration is then checked again, 112. If the acceleration is above the threshold value, the appropriate valve 42 is opened to increase the size of one of the bolsters 18, 20. Ongoing measurements of the acceleration determine when the acceleration has dropped below the deactivation threshold value, 0.15 g in the preferred embodiment. If the acceleration has not dropped below the activation threshold during the measurement activity, the valve 42 will remain open. If, however, the acceleration has dropped below the deactivation threshold, the valve 43 will be closed and the bolster 18 or 20 will be reduced in size. After which time the acceleration will be checked again.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

We claim:

1. A vehicular seat assembly (10) comprising:
   a seat cushion (12);
   a seat back (14) pivotal about said seat cushion (12);
   two bolsters (18, 20), with one bolster (18, 20) secured to each side of said seat back (14);
   primary adjustment means (22) for adjusting each of said bolsters (18, 20) relative to said seat back (14) to provide support to an occupant, and
   secondary adjustment means (24) disposed adjacent said primary adjustment means (22) for adjusting each of said bolsters (18, 20) to provide additional support to the occupant independent of said primary adjustment means (22) when said vehicular seat assembly (10) receives forces of lateral acceleration (36, 38) above a predetermined threshold.

2. An assembly (10) as set forth in claim 1 wherein said secondary adjustment means (24) including first (28) and second (30) adjustable halves.

3. An assembly (10) as set forth in claim 2 wherein said first (28) and second (30) adjustable halves are extendable between retracted and deployed positions.

4. An assembly (10) as set forth in claim 3 further including control means (32) for moving said first (28) and second (30) adjustable halves between said positions independently of each other.

5. An assembly (10) as set forth in claim 4 further including sensing means (34) connected to said control means (32) for sensing lateral acceleration (36, 38) of said vehicular seat assembly (10).

6. An assembly (10) as set forth in claim 5 further including activating means (40) deploying each of said first (28) and second (30) adjustable halves at first and second lateral accelerations, said first and second lateral acceleration being equal and opposite in direction.

7. An assembly (10) as set forth in claim 6 further including deactivating means (58) for retracting each of said first (28) and second (30) adjustable halves at third and fourth lateral accelerations, said third and fourth lateral accelerations being equal in opposite directions.

8. An assembly (10) as set forth in claim 7 wherein said first (28) and second (30) adjustable halves include inflatable bags (26).

9. An assembly (10) as set forth in claim 8 further including valving means (43) controllable by said control means (32), said valving means (43) movable between an open position and a closed position, said valving means (43) allowing fluid to pass into and out of said inflatable bags (26) when in said open position.

10. An assembly (10) as set forth in claim 9 wherein said activating means (40) includes a solenoid responsive to said control means (32) for moving said valving means (43) between open and closed positions.

11. An assembly (10) as set forth in claim 10 further including a regulator (58) for releasing air from said inflatable bags (26).

12. An assembly (10) as set forth in claim 11 further including a reservoir (56) for storing compressed air therein.

13. An assembly (10) as set forth in claim 12 further including a compressor (54) for compressing air into said reservoir (56).

14. An assembly (10) as set forth in claim 13 further including a pressure sensitive switch (60) for measuring the pressure of the compressed air and said reservoir (56) and for switching said compressor (54) on and off.

15. An assembly (10) as set forth in claim 14 wherein said sensing means (34) includes an accelerometer.

16. A vehicle seat assembly (10) comprising:

a seat cushion (12);

a seat back (14) extending out from and pivotal about said seat cushion (12); at least two bolsters (18, 20), each of said two bolsters (18, 20) fixedly secured to said seat back (14) on either side thereof;

a first set of adjustors (22) manually adjustable to a predetermined comfort setting to adjust each of said bolsters (18, 20) relative to said seat back (14), and a second set of adjustors (26) disposed adjacent said first adjustors (22) for adjusting each of said bolsters (18, 20) independently of said first adjustors (22) when Said vehicular seat assembly (10) receives forces of lateral acceleration (36, 38) above a predetermined threshold.

* * * * *